United States Patent
Suzuki et al.

(10) Patent No.: US 6,600,705 B2
(45) Date of Patent: Jul. 29, 2003

(54) METHOD OF AND APPARATUS FOR SETTING SERVO ADJUSTMENT VALUE, REPRODUCING INFORMATION AND RECORDING INFORMATION UNDER SERVO CONTROL USING SERVO ADJUSTMENT VALUE

(75) Inventors: Takashi Suzuki, Kawagoe (JP); Takashi Sasaki, Kawagoe (JP); Hideaki Yoshimura, Kawagoe (JP); Koichi Kikuchi, Kawagoe (JP); Yoshihiro Hashizuka, Kawagoe (JP); Shinya Honjou, Kawagoe (JP); Kenichi Takahashi, Kawagoe (JP); Takao Shimamura, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 177 days.

(21) Appl. No.: 09/745,258

(22) Filed: Dec. 20, 2000

(65) Prior Publication Data

US 2001/0004341 A1 Jun. 21, 2001

(30) Foreign Application Priority Data

Dec. 21, 1999 (JP) .......................................... 11-363240

(51) Int. Cl.$^7$ ................................................ G11B 7/00
(52) U.S. Cl. ................................ 369/44.27; 369/44.35; 369/53.37; 369/94
(58) Field of Search ........................... 369/44.25, 44.26, 369/44.27, 44.35, 47.55, 53.2, 53.23, 53.37, 53.41, 53.45, 94

(56) References Cited

U.S. PATENT DOCUMENTS

| 5,859,824 | A | | 1/1999 | Izumi et al. |
| 6,101,156 | A | * | 8/2000 | Tanaka et al. ........... 369/44.28 |
| 6,108,291 | A | * | 8/2000 | Ono et al. ................ 369/44.28 |
| 6,292,453 | B1 | * | 9/2001 | Ichimura et al. ......... 369/44.23 |

FOREIGN PATENT DOCUMENTS

| EP | 0 807 926 A1 | 11/1997 |
| EP | 0 840 295 A2 | 5/1998 |

* cited by examiner

Primary Examiner—Paul W. Huber
(74) Attorney, Agent, or Firm—Ladas & Parry (57) ABSTRACT

A servo adjustment apparatus for setting an adjustment value for servo control of at least one of optical recording of information on information recording surfaces and optical reproduction of information recorded on the information recording surfaces, is provided. A setting device sets an adjustment value corresponding to one of the information recording surfaces. Another setting device sets another adjustment value corresponding to another one of the surfaces other than the one of information recording surfaces. Then a calculation device calculates a relational value indicating a relationship between the adjustment value and another adjustment value. A storage device stores calculated relational value. A resetting device resets the adjustment value using another adjustment value set previously and the relational value when the adjustment value is reset, and resets another adjustment value using the adjustment value set previously and the relational value when another adjustment value is reset.

16 Claims, 5 Drawing Sheets

METHOD OF AND APPARATUS FOR SETTING SERVO ADJUSTMENT VALUE, REPRODUCING INFORMATION AND RECORDING INFORMATION UNDER SERVO CONTROL USING SERVO ADJUSTMENT VALUE

BACKGROUND OF THE INVENTION

1. Field of the Invention

The present invention belongs to the technical field of a method of and an apparatus for setting servo adjustment value, reproducing information under servo control using the servo adjustment value, and recording information under servo control using the servo adjustment value. More particularly, the present invention belongs to the technical field of a servo adjustment method of and apparatus for setting various adjustment values related to servo control at the time of optically recording or reproducing information on or from an information recording surface as well as an information reproducing method and an information reproducing method each including the servo adjustment method, and an information recording apparatus and an information recording apparatus each including the servo adjustment apparatus.

2. Description of the Related Art

Conventionally, at the time of optically recording or reproducing information on or from a so-called optical disk, it has been necessary to conduct information recording or reproduction while controlling a focal position of a light beam on the optical disk by conducting servo control in various manners including, for example, tracking servo control, focus servo control and carriage servo control.

When starting the above-described servo control, it is necessary to preset various adjustment values such as the gain of an amplifier included in a servo loop in each servo control.

On the other hand, optical disks such as a so-called DVD wherein two or more layers of information recording surfaces are formed on a single optical disk have become recently, increasingly popular in the field of on-vehicle navigation equipment. In case of the optical disk provided with a plurality of information recording surfaces as described above, if information is recorded or reproduced on or from the respective information surfaces, it is required to start recording or reproduction after setting adjustment values described above for every information recording surface.

However, the recording or reproduction of information on or from an optical disk provided with a plurality of information recording surfaces has a problem that if information is recorded or reproduced while setting the adjustment values for the respective information recording surfaces as described above, it takes time to make such settings equally for the respective information recording surfaces and the recording or reproduction of information cannot be promptly started.

To be specific, in case of, for example, a two-layer type DVD, it takes time twice as long as that for a single-layer DVD to set adjustment values and it is impossible to promptly start recording or reproducing information for the respective layers.

This problem also produces another problem that if, for example, recording or reproducing information on or from two layers is conducted, the recording or reproduction operation must be temporarily stopped when one information recording surface is switched over to another.

SUMMARY OF THE INVENTION

The present invention has been made in view of the above-described problems. It is an object of the present invention to provide a servo adjustment apparatus and method capable of promptly starting the recording of information on respective information recording surfaces or the reproduction of information from the respective information recording surfaces by promptly completing the settings of adjustment values for servo control in accordance with the respective recording surfaces, as well as an information recording apparatus and an information reproduction apparatus each including the servo adjustment apparatus, and an information recording method and an information reproduction method each including the servo adjustment method.

The above object of the present invention can be achieved by a servo adjustment apparatus for setting an adjustment value for servo control of at least one of optical recording of information on information recording surfaces and optical reproduction of information recorded on the information recording surfaces. The servo adjustment apparatus is provided with: a specific setting device for setting a specific adjustment value corresponding to one of said information recording surfaces; an other setting device for setting another adjustment value corresponding to another one of said information recording surfaces other than said one of said information recording surfaces; a calculation device for calculating a relational value indicating a relationship between said specific adjustment value and said another adjustment value; a storage device for storing said calculated relational value; and a resetting device for resetting the specific adjustment value using said another adjustment value set previously and said relational value when said specific adjustment value is reset, and for resetting said another adjustment value using said specific adjustment value set previously and said relational value when said another adjustment value is reset.

According to the servo adjustment apparatus of present invention, the specific setting device sets the specific adjustment value corresponding to one of the information recording surfaces. The other setting device sets another adjustment value corresponding to another one of the information recording surfaces other than the one of the information recording surfaces. Then the calculation device calculates the relational value indicating the relationship between the specific adjustment value and another adjustment value. Further, the storage device stores calculated relational value. Moreover, the resetting device resets the specific adjustment value using another adjustment value set previously and the relational value when the specific adjustment value is reset, and resets another adjustment value using the specific adjustment value set previously and the relational value when another adjustment value is reset.

Therefore, if the adjustment value or another adjustment value is reset, it is not necessary to repeat the original setting processing for the corresponding information recording surface, making it possible to shorten time for resetting the adjustment value or another adjustment value and to promptly complete the resetting processing.

In one aspect of the servo adjustment apparatus, each of the adjustment values is a gain value in the servo control.

Therefore, it possible to shorten time for resetting each of gain values and to promptly complete the resetting processing.

In another aspect of the servo adjustment apparatus, the storage device stores the relational value and identification information for identifying the information recording surface corresponding to the relational value, while associating the relational value with the identification information.

Therefore, it is possible to ensure associating each information recording surface with the relational value and to accurately reset each adjustment value.

In another aspect of the servo adjustment apparatus, the relational value is a difference between the specific adjustment value set previously and another adjustment value set previously. Further, the resetting device resets the specific adjustment value by subtracting the relational value from another adjustment value set previously when the specific adjustment value is reset, and resets another adjustment value by subtracting the relational value from the specific adjustment value set previously when another adjustment value is reset.

Therefore, it is possible to reset each adjustment value in a short time only by conducting a simple processing such as subtraction without the need to repeat the original setting processing.

In another aspect of the servo adjustment apparatus, one of the information recording surfaces and another one of the information recording surfaces are formed in one optical disk while being layered and away from each other.

Therefore, if adjustment values are reset for each of one information recording surface and another information recording surface formed in an optical disk, it is possible to shorten time necessary for making the resetting.

In another aspect of the servo adjustment apparatus, one of the information recording surfaces is formed in one optical disk, and another one of the information recording surfaces is formed in an optical disk, other than the one optical disk, installed simultaneously with the one optical disk.

Therefore, if adjustment values are reset for each of one information recording surface and another information recording surface formed in each optical disk of a plurality of optical disks installed simultaneously, it is possible to shorten time necessary for making the resetting.

The above object of the present invention can be achieved by an information recording apparatus. The information recording apparatus has a servo adjustment apparatus and a recording device. The servo adjustment apparatus sets an adjustment value for servo control of at least one of optical recording of information on information recording surfaces and optical reproduction of information recorded on the information recording surfaces. The servo adjustment apparatus is provided with: a specific setting device for setting a specific adjustment value corresponding to one of said information recording surfaces; an other setting device for setting another adjustment value corresponding to another one of said information recording surfaces other than said one of said information recording surfaces; a calculation device for calculating a relational value indicating a relationship between said specific adjustment value and said another adjustment value; a storage device for storing said calculated relational value; and a resetting device for resetting the specific adjustment value using said another adjustment value set previously and said relational value when said specific adjustment value is reset, and for resetting said another adjustment value using said specific adjustment value set previously and said relational value when said another adjustment value is reset. Further, the recording device records said information on one of said information recording surfaces or another one of said information recording surfaces while conducting said servo control using said reset adjustment value.

According to the information recording apparatus of present invention, the specific setting device sets the specific adjustment value corresponding to one of the information recording surfaces. The other setting device sets another adjustment value corresponding to another one of the information recording surfaces other than the one of the information recording surfaces. Then the calculation device calculates the relational value indicating the relationship between the specific adjustment value and another adjustment value. Further, the storage device stores calculated relational value. Moreover, the resetting device resets the specific adjustment value using another adjustment value set previously and the relational value when the specific adjustment value is reset, and resets another adjustment value using the specific adjustment value set previously and the relational value when another adjustment value is reset. Then, the recording device records the information on one of the information recording surfaces or another one of the information recording surfaces while conducting the servo control using the reset adjustment value.

Therefore, if the adjustment value or another adjustment value is reset, it is not necessary to repeat the original setting processing for the corresponding information recording surface, making it possible to shorten time for resetting the adjustment value or another adjustment value and to promptly complete the resetting processing. As a result, it is possible to promptly start recording information for the information recording surfaces.

The above object of the present invention can be achieved by an information reproduction apparatus. The information reproduction apparatus has a servo adjustment apparatus and a reproduction device. The servo adjustment apparatus sets an adjustment value for servo control of at least one of optical recording of information on information recording surfaces and optical reproduction of information recorded on the information recording surfaces. The servo adjustment apparatus is provided with: a specific setting device for setting a specific adjustment value corresponding to one of said information recording surfaces; an other setting device for setting another adjustment value corresponding to another one of said information recording surfaces other than said one of said information recording surfaces; a calculation device for calculating a relational value indicating a relationship between said specific adjustment value and said another adjustment value; a storage device for storing said calculated relational value; and a resetting device for resetting the specific adjustment value using said another adjustment value set previously and said relational value when said specific adjustment value is reset, and for resetting said another adjustment value using said specific adjustment value set previously and said relational value when said another adjustment value is reset. Further, the reproduction device reproduces the information recorded on one of the information recording surfaces and another one of the information recording surfaces while conducting the servo control using the reset adjustment value.

According to the information reproduction apparatus of present invention, the specific setting device sets the specific adjustment value corresponding to one of the information recording surfaces. The other setting device sets another adjustment value corresponding to another one of the information recording surfaces other than the one of the information recording surfaces. Then the calculation device calculates the relational value indicating the relationship between the specific adjustment value and another adjustment value. Further, the storage device stores calculated relational value. Moreover, the resetting device resets the specific adjustment value using another adjustment value set previously and the relational value when the specific adjustment value is reset, and resets another adjustment value using the specific adjustment value set previously and the relational value when another adjustment value is reset. Then, the reproduction device reproduces the information recorded on one of the information recording surfaces and another one of the information recording surfaces while conducting the servo control using the reset adjustment value.

Therefore, if the adjustment value or another adjustment value is reset, it is not necessary to repeat the original setting processing for the corresponding information recording surface, making it possible to shorten time for resetting the adjustment value or another adjustment value and to promptly complete the resetting processing. As a result, it is possible to promptly start reproducing information for the information recording surfaces.

The above object of the present invention can be achieved by a servo adjustment method of setting an adjustment value for servo control of at least one of optical recording of information on information recording surfaces and optical reproduction of information recorded on the information recording surfaces. The servo adjustment method has the processes of: setting a specific adjustment value corresponding to one of said information recording surfaces; setting another adjustment value corresponding to another one of said information recording surfaces other than said one of said information recording surfaces; calculating a relational value indicating a relationship between said specific adjustment value and said another adjustment value; storing said calculated relational value; resetting the specific adjustment value using said another adjustment value set previously and said relational value when said specific adjustment value is reset; and resetting said another adjustment value using said specific adjustment value set previously and said relational value when said another adjustment value is reset.

According to the servo adjustment method of present invention, the specific adjustment value corresponding to one of the information recording surfaces is set. Another adjustment value corresponding to another one of the information recording surfaces other than the one of the information recording surfaces is set. Then the relational value indicating the relationship between the specific adjustment value and another adjustment value is calculated. Further, calculated relational value is stored. Moreover, the specific adjustment value is reset using another adjustment value set previously and the relational value, and another adjustment value is reset using the specific adjustment value set previously and the relational value.

Therefore, if the adjustment value or another adjustment value is reset, it is not necessary to repeat the original setting processing for the corresponding information recording surface, making it possible to shorten time for resetting the adjustment value or another adjustment value and to promptly complete the resetting processing.

In one aspect of the servo adjustment method, each of the adjustment values is a gain value in the servo control.

Therefore, it possible to shorten time for resetting each of gain values and to promptly complete the resetting processing.

In another aspect of the servo adjustment method, the process of storing calculated relational value stores the relational value and identification information for identifying the information recording surface corresponding to the relational value, while associating the relational value with the identification information.

Therefore, it is possible to ensure associating each information recording surface with the relational value and to accurately reset each adjustment value.

In another aspect of the servo adjustment method, the relational value is a difference between the specific adjustment value set previously and said another adjustment value set previously. Further, the process of resetting the specific adjustment value resets the specific adjustment value by subtracting the relational value from another adjustment value set previously when the specific adjustment value is reset. Moreover, the process of resetting another adjustment value resets the another adjustment value by subtracting the relational value from the specific adjustment value set previously when another adjustment value is reset.

Therefore, it is possible to reset each adjustment value in a short time only by conducting a simple processing such as subtraction without the need to repeat the original setting processing.

In another aspect of the servo adjustment method, one of the information recording surfaces and another one of the information recording surfaces are formed in one optical disk while being layered and away from each other.

Therefore, if adjustment values are reset for each of one information recording surface and another information recording surface formed in an optical disk, it is possible to shorten time necessary for making the resetting.

In another aspect of the servo adjustment method, one of the information recording surfaces is formed in one optical disk, and another one of the information recording surfaces is formed in an optical disk, other than the one optical disk, installed simultaneously with the one optical disk.

Therefore, if adjustment values are reset for each of one information recording surface and another information recording surface formed in each optical disk of a plurality of optical disks installed simultaneously, it is possible to shorten time necessary for making the resetting.

The above object of the present invention can be achieved by an information recording method. The information recording method is provided with the process of setting an adjustment value for servo control of at least one of optical recording of information on information recording surfaces and optical reproduction of information recorded on the information recording surfaces, and the process of recording said information. The process of setting an adjustment value has the processes of: setting a specific adjustment value corresponding to one of said information recording surfaces; setting another adjustment value corresponding to another one of said information recording surfaces other than said one of said information recording surfaces; calculating a relational value indicating a relationship between said specific adjustment value and said another adjustment value; storing said calculated relational value; resetting the specific adjustment value using said another adjustment value set previously and said relational value when said specific adjustment value is reset; and resetting said another adjustment value using said specific adjustment value set previously and said relational value when said another adjustment value is reset. Further, the process of recording said information records said information on one of said information recording surfaces or another one of said information recording surfaces while conducting said servo control using said reset adjustment value.

According to the servo adjustment method of present invention, the specific adjustment value corresponding to one of the information recording surfaces is set. Another adjustment value corresponding to another one of the information recording surfaces other than the one of the information recording surfaces is set. Then the relational value indicating the relationship between the specific adjustment value and another adjustment value is calculated. Further, calculated relational value is stored. Moreover, the specific adjustment value is reset using another adjustment value set previously and the relational value, and another adjustment value is reset using the specific adjustment value set previously and the relational value. Further, the information is recorded on one of the information recording surfaces or another one of the information recording surfaces while conducting the servo control using the reset adjustment value.

Therefore, if the adjustment value or another adjustment value is reset, it is not necessary to repeat the original setting processing for the corresponding information recording surface, making it possible to shorten time for resetting the adjustment value or another adjustment value and to promptly complete the resetting processing. As a result, it is possible to promptly start recording information for the information recording surfaces.

The above object of the present invention can be achieved by an information reproduction method. The information reproduction method is provided with the process of setting an adjustment value for servo control of at least one of optical recording of information on information recording surfaces and optical reproduction of information recorded on the information recording surfaces, and the process of reproducing said information. The process of setting an adjustment value has the processes of: setting a specific adjustment value corresponding to one of said information recording surfaces; setting another adjustment value corresponding to another one of said information recording surfaces other than said one of said information recording surfaces; calculating a relational value indicating a relationship between said specific adjustment value and said another adjustment value; storing said calculated relational value; resetting the specific adjustment value using said another adjustment value set previously and said relational value when said specific adjustment value is reset; and resetting said another adjustment value using said specific adjustment value set previously and said relational value when said another adjustment value is reset. Further, the process of reproducing reproduces said information recorded on one of said information recording surfaces and another one of said information recording surfaces while conducting said servo control using said reset adjustment value.

According to the servo adjustment method of present invention, the specific adjustment value corresponding to one of the information recording surfaces is set. Another adjustment value corresponding to another one of the information recording surfaces other than the one of the information recording surfaces is set. Then the relational value indicating the relationship between the specific adjustment value and another adjustment value is calculated. Further, calculated relational value is stored. Moreover, the specific adjustment value is reset using another adjustment value set previously and the relational value, and another adjustment value is reset using the specific adjustment value set previously and the relational value. Further, the information recorded on one of said information recording surfaces and another one of said information recording surfaces is reproduced while conducting the servo control using the reset adjustment value.

Therefore, if the adjustment value or another adjustment value is reset, it is not necessary to repeat the original setting processing for the corresponding information recording surface, making it possible to shorten time for resetting the adjustment value or another adjustment value and to promptly complete the resetting processing. As a result, it is possible to promptly start reproducing information for the information recording surfaces.

DETAILED DESCRIPTION OF THE PREFERRED EMBODIMENTS

Next, the preferred embodiments of the present invention will be described based on the drawings.

(I) First Embodiment

Figure 1:
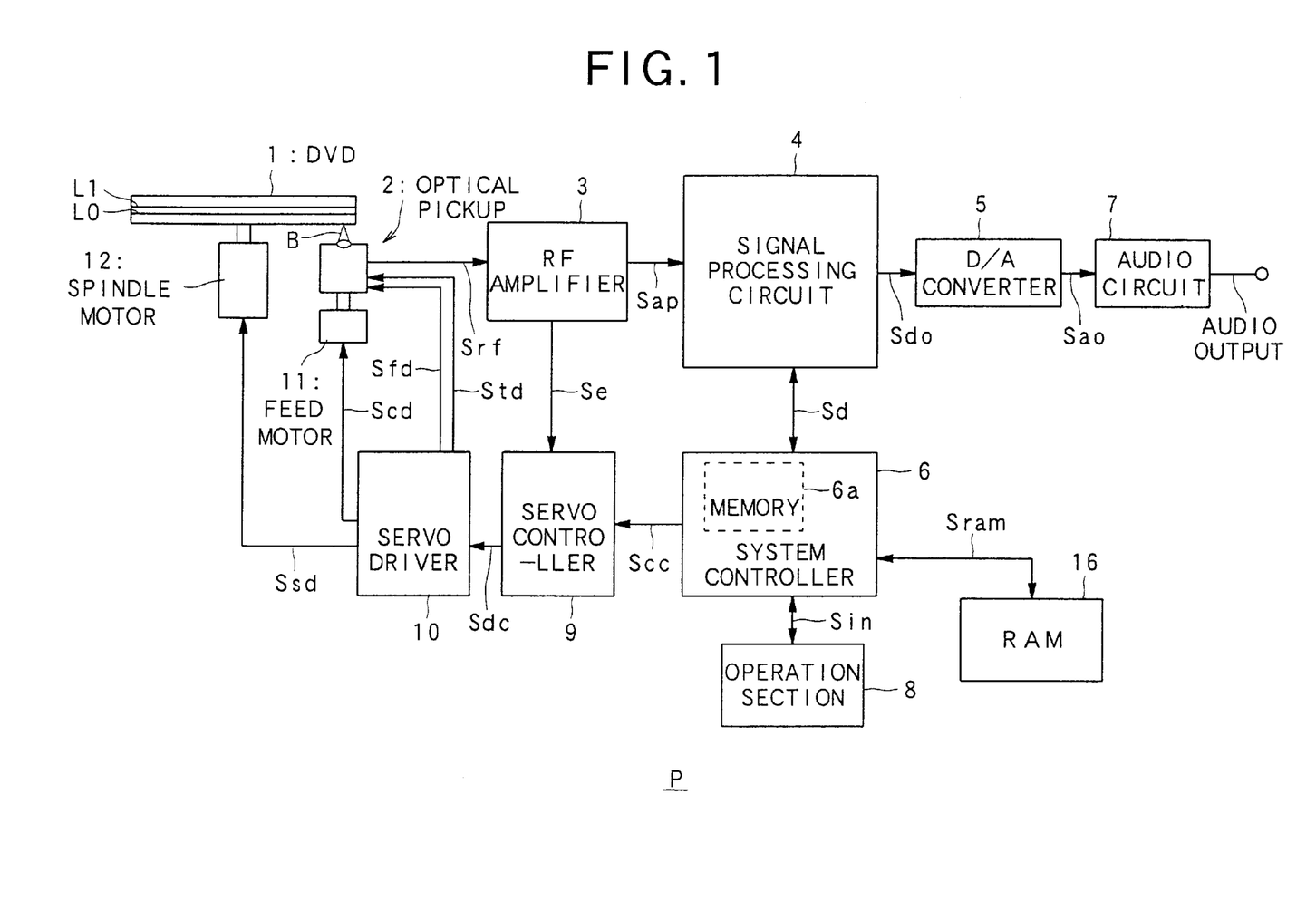
FIG. 1 is a block diagram showing the schematic constitution of an information reproduction apparatus according to a first embodiment of the present invention.
Figure 2:
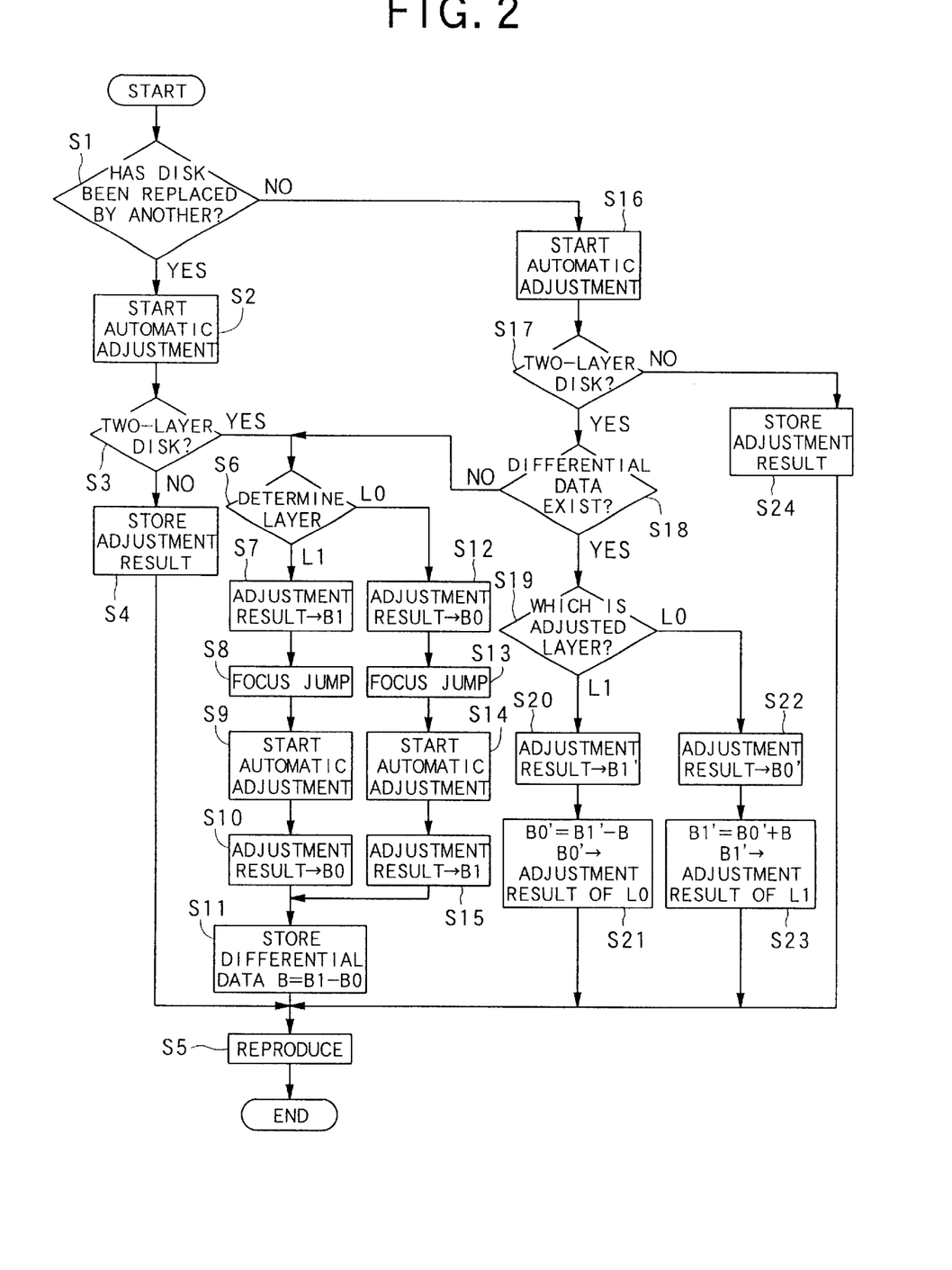
FIG. 2 is a flowchart showing an information reproduction processing according to the first embodiment.

Initially, the first embodiment according to the present invention will be described with reference to FIGS. 1 and 2. FIG. 1 is a block diagram showing the schematic constitution of an information reproduction apparatus according to the first embodiment, and FIG. 2 is a flowchart showing information reproduction processings according to the first embodiment.

Also, the first embodiment described hereinafter is an embodiment in which the present invention is applied to an information reproduction apparatus for optically reproducing audio information (including both music information and sound information other than music) recorded on two information recording surfaces, respectively, of a DVD having two layers of these information recording surfaces.

First, the constitution and overall operation of the information recording apparatus according to the first embodiment will be described with reference to FIG. 1.

As shown in FIG. 1, an information reproduction apparatus P according to the first embodiment is comprised of an optical pickup 2, an RF (Radio Frequency) amplifier 3, a signal processing circuit 4 serving, a D/A (Digital/Analog) converter 5, a system controller 6 including a memory 6a serving as a readable and writable recording means, an audio circuit 7, an operation section 8, a servo controller 9, a servo driver 10, a feed motor 11, a spindle motor 12 and an RAM (Random Access Memory) 16.

Next, the overall operation of the respective constituent elements will be described.

First, the optical pickup 2 emits a light beam B such as laser light for information reproduction onto a DVD 1 having two information recording surface layers L0 and L1, generates a detection signal Srf corresponding to audio information recorded on the information recording surface L0 or L1 based on the reflection light of the light beam B and outputs the detection signal Srf to the RF amplifier 3.

At this moment, the light beam B is emitted to either the information recording surface L0 or L1 while conducting focus servo control and tracking servo control by the servo driver 10 to be described later so that the light beam B takes the focus on an information track formed on either the information recording surface L0 or L1.

Next, the RF amplifier 3 conducts a processing, such as amplification, to the generated detection signal Srf, generates an amplification signal Sap corresponding to the audio information and outputs the generated signal Sap to the signal processing circuit 4. The RF amplifier 3 also extracts an error signal (which is an error signal indicating the displacement of the focal position of the light beam B from the position on the information track in direction perpendicular and horizontal to the information recording surface L0 or l1) Se for executing the above-described focus servo control and tracking servo control from the detection signal Srf, and outputs the extracted error signal Se to the servo controller 9.

Then, the signal processing circuit 4 executes a decoding processing preset for the inputted amplification signal Sap (i.e., a decoding processing corresponding to an encoding processing for the audio information recorded on the DVD 1) while transmitting and receiving a control signal Sd to and from the system controller 6, generates a reproduction signal Sdo corresponding to the audio information recorded on the DVD 1 and outputs the generated reproduction signal Sdo to the D/A converter 5.

The D/A converter 5 converts the reproduction signal Sdo to generate an analog reproduction signal Sao and outputs the analog reproduction signal Sao to the audio circuit 7.

Thereafter, the audio circuit 7 conducts a particular processing (e.g., a so-called emphasis processing or down-mix processing) to the analog reproduction signal Sao for reproducing the audio information, and outputs the resultant signal to an external speaker (not shown) or the like.

Simultaneously with these processings, the servo controller 9 into which the error signal Se is inputted generates a servo control signal Sdc for the above-described focus servo control and tracking servo control so as to compensate for the displacement of the focal position of the light beam B in respective directions which errors are indicated by the error signal Se based on a control signal Scc from the system controller 6, and outputs the generated servo control signal Sdc to the servo driver 10.

At this time, the servo control signal Sdc includes not only control signals necessary to control the focal position and to obtain adjustment values to be described later but also control signals necessary for the focus servo control and tracking servo control actually conducted after setting the adjustment values.

Next, the servo driver 10 generates drive signals necessary for the respective servo controls based on the servo control signal Sdc and outputs the generated drive signals to corresponding actuators (not shown) or the like provided in the optical pickup 2.

Namely, the servo driver 10 first generates a spindle servo drive signal Ssd for rotating the DVD 1 at a preset rotation speed, and outputs the signal Ssd to the spindle motor 12. By doing so, the spindle motor 12 rotates the DVD 1 at the above rotation speed indicated by the spindle servo drive signal Ssd.

Secondly, the servo driver 10 generate a focus servo drive signal Sfd for controlling the focal position of the light beam B in a direction perpendicular to the information recording surface L0 or L1, and outputs the generated signal Sfd to a focus actuator (not shown) provided in the optical pickup 2. In response, the focus actuator controls the position of an object lens for focusing the light beam B in a direction perpendicular to the information recording surface L0 or L1, and controls the focal position of the light beam B in the perpendicular direction.

Thirdly, the servo driver 10 generates a tracking servo drive signal Std for controlling the focal position of the light beam B in a direction horizontal to the information recording surface L0 or L1, and outputs the generated signal Std to a tracking actuator (not shown) provided in the optical pickup 2. Then, the tracking actuator controls the position of the object lens for focusing the light beam B in a direction horizontal to the information recording surface L0 or L1, and controls the focal position of the light beam B in the horizontal direction.

Lastly, the servo driver 10 generates a carriage servo drive signal Scd for further controlling the focal position of the light beam B in the direction horizontal to the information recording surface L0 or L1, and outputs the generated signal Scd to the feed motor 11 for moving the optical pickup 2 in the radial direction of the DVD 1. Then, the feed motor 11 controls the position of the optical pickup 2 itself in the direction horizontal to the information recording surface L0 or L1 (i.e., the radial direction of the DVD 1), thereby servo-controlling the focal position of the light beam B to be returned to its original position if the focal position of the light beam B exceeds the operating range of the object lens in the horizontal direction and is displaced horizontally.

Simultaneously with the reproduction operation and the servo control operation described above, the system controller 6 entirely controls the operations of the respective constituent elements described above by generating the above-described control signals Scc and Sd based on an instruction signal Sin corresponding to a user's instruction operation in the operation section 8.

At this moment, information necessary for the operation of the system controller 6 is temporarily stored as a RAM signal Sram in the RAM 16.

Further, the operation state of the information reproduction apparatus P is displayed on a display section (not shown) as needed.

Adjustment values necessary for the respective servo controls and set in information reproduction processings according to the first embodiment to be described later are temporarily recorded on the memory 6a and also read as needed to be used for the servo controls.

Next, information reproduction processings according to the first embodiment will be described with reference to FIG. 2.

The information reproduction processings shown in FIG. 2 are information reproduction processings executed mainly under the control of the system controller 6, for reproducing audio information recorded on the DVD 1 while setting adjustment values used for the focus servo control described above (including an amplification factor (gain), a time constant and the like in a focus servo loop, which will be simply referred to as adjustment values hereinafter).

Among the information reproduction processings shown in FIG. 2, a processing for setting the above-described adjustment values is conducted when power is turned on or every time reproduction is resumed after stopping reproduction.

As shown in FIG. 2, in the information reproduction processings in the first embodiment, it is first determined whether or not the DVD 1 installed into the information reproduction apparatus P has been replaced (or changed over) based on whether or not a so-called clamp operation has been executed (step S1).

Then, if the replacement of the DVD 1 has been executed (step S1; 'YES'), the adjustment value corresponding to each information recording surface (only one information recording surface or two information recording surfaces) is obtained by a method of, for example, reciprocating the focal position of the light beam B in a direction perpendicular to the information recording surface of the DVD replaced from the DVD 1 (step S2)

Next, it is determined whether or not the DVD thus installed is a two-layer disk (i.e., another DVD 1 having two kinds of information recording surface layers) by detecting identification information or the like of the DVD 1 (step S3).

If the DVD is not a two-layer disk (step S3; 'NO'), the adjustment value obtained at the step S2 can be used for information reproduction as it is. Therefore, the obtained adjustment value is stored in the memory 6a (step S4), audio information recorded on the single-layer DVD thus installed is reproduced while focus servo control is conducted using the stored adjustment value (step S5), thereby ending a series of processings.

On the other hand, if the DVD installed is determined to be a two-layer disk DVD 1 at the step S3 (step S3; 'YES'), then it is determined which information recording surface the information recording surface for which the adjustment value has been obtained at the step S2 is (step S6).

The determination method of the step S6 will be described more specifically. In the determination, if the processing of the step S2 is conducted using the information recording surface which is detected first by moving the focal position of the light beam B from downward to upward of FIG. 1 at, for example, the DVD 1 shown in FIG. 1, it can be determined that the information recording surface used for the calculation of the adjustment value is the information recording surface L0. On the other hand, if the processing of the step S2 is conducted using the information recording surface which is detected first by moving the focal position of the light beam B from upward to downward of FIG. 1, it can be determined that the information recording surface used for the calculation of the adjustment value is the information recording surface L1.

Then, if the result of the determination of the step S6 indicates that the information recording surface used for the calculation of the adjustment value is the information recording surface L1 (step S6; 'L1'), then the obtained adjustment value is stored as an adjustment value B1 in the memory 6a (step S7), further the movement of the object lens is controlled so as to conduct a so-called focus jump processing for moving the focal position of the light beam B from the information recording surface L1 to the information recording surface L0 at a stretch (step S8) and a new adjustment value corresponding to the information recording surface L0 is calculated using the information recording surface L0 to which the focal position of the light beam B is moved after the focus jump (step S9).

Thereafter, the calculated adjustment value is stored as an adjustment value B0 in the memory 6a (step S10), differential data B is calculated by subtracting the adjustment value B0 (which is the adjustment value corresponding to the information recording surface L0) stored at the step S10 from the adjustment value B1 (which is the adjustment value corresponding to the information recording surface L1) stored at the step S7, and the calculated differential data B is stored in the memory 6a (step S11). Further, audio information is reproduced from the information recording surface L0 or L1 while conducting focus servo control using the calculated adjustment value B0 or B1 (step S5), thus ending a series of processings.

On the other hand, if the determination of the step S6 indicates that the information recording surface used for the calculation of the adjustment value at the step S2 is the information recording surface L0 (step S6; 'L0'), then the obtained adjustment value is stored as an adjustment value B0 in the memory 6a (step S12), further the movement of the object lens is controlled so as to conduct the focus jump processing from the information recording surface L0 to the information recording surface L1 (step S13), and a new adjustment value corresponding to the information recording surface L1 is calculated using the information recording surface L1 to which the focal position of the light beam B is moved after the focus jump (step 14).

Thereafter, the calculated adjustment value is stores as an adjustment value B1 in the memory 6a (step S15), differential data B between the adjustment value B0 stored at the step S12 and the adjustment value B1 stored at the step 15 is calculated and stored in the memory 6a (step S11), and further audio information is reproduced from the information recording surface L0 or L1 while conducting focus servo control using the calculated adjustment value B0 or B1 (the step S5), thus ending a series of processings.

Next, if the determination result of the step S1 indicates that the replacement of the DVD 1 is not executed and that the DVD 1 for which the calculation and storage of the differential data B described above (see the step S11 described above) have been already completed, is installed into the information reproduction apparatus P (step S1; 'NO'), then the adjustment value is newly calculated using one of the information recording surfaces on the installed DVD 1 (step S16).

It is then determined whether or not the installed DVD is a two-layer disk by the same method as that at the step S3 (step S17). If the DVD is nota two-layer disk (step S17; 'NO'), the adjustment value obtained at the step S16 can be used for information reproduction as it is. Therefore, the obtained adjustment value is stored in the memory 6a (step S24) and audio information recorded on the installed single-layer DVD is reproduced while conducting focus servo control using the stored adjustment value (step S5), thus ending a series of processings.

On the other hand, if the determination of the step S17 indicates that the installed DVD is a DVD 1 which is a two-layer disk (step S17; 'YES'), then it is checked whether or not the above-described differential data B is stored in the memory 6a (step S18).

In this step S18, the differential data B is supposed to be stored in the memory 6a (step S18; 'YES'). However, if focus servo control is started while, for example, the above-described adjustment values cannot be calculated in a series of processings at the steps 2 to 15 (note, the information recording and reproduction apparatus P is designed to be capable of executing focus servo control by using a preset adjustment value or the like set in advance even if the adjustment value cannot be calculated accurately for some reason), then it is determined as "NO" at the step S18. If so, the processings of the steps S6 to S15 as described above are executed again.

If it is determined at the step S18 that the differential data B is stored (step S18; 'YES'), then it is determined which information recording surface the information recording surface for which the adjustment value has been obtained at the step S16 is by the same method as that at the step S6 (step S19).

Then, if the determination result of the step S19 indicates that the information recording surface used for the calculation of the adjustment value at the step S16 is the information recording surface L1 (step S19; 'L1'), then the obtained adjustment value is stored as an adjustment value B1' in the memory 6a (step S20) and further an adjustment value B0' obtained by subtracting the stored differential data B from the new adjustment value B1' is regarded as a new adjustment value corresponding to the information recording surface L0 and stored in the memory 6a (step S21). At the step S21, the adjustment value B0' is obtained by subtracting the differential data B from the adjustment value B1' because the differential data B is calculated by subtracting the adjustment value B0 from the adjustment value B1 at the step S11.

Thereafter, audio information is reproduced from the information recording surface L0 or L1 while conducting focus servo control using the stored adjustment value B0' or B1' (step S5), and a series of processings are ended.

On the other hand, if the determination of the step S19 indicates that the information recording surface used for the calculation of the adjustment value at the step S16 is the information recording surface L0 (step S19; 'L0'), then the obtained adjustment value is stored as an adjustment value B0' in the memory 6a (step S22), further an adjustment value B1' obtained by adding differential data B stored to the new adjustment value B0' is regarded as a new adjustment value corresponding to the information recording surface L1 and the adjustment value B1' is stored in the memory 6a (step S23). At the step S23, the adjustment value B1' is obtained by adding the differential data B to the adjustment value B0' because the differential data B is calculated by subtracting the adjustment value B0 from the adjustment value B1 at the step 11.

Thereafter, audio information is reproduced from the information recording surface L0 or L1 while conducting servo control using the stored adjustment value B0' or B1' (step S5), and a series of processings are ended.

As stated so far, according to the information reproduction processings in the first embodiment, if the adjustment value corresponding to one information recording surface L0 or L1 is reset, the resetting is made by using the adjustment value corresponding to the other information recording surface L0 or L1 previously set and the stored differential data B. Therefore, if the adjustment value is reset, it is not necessary to repeat the original setting processing for the corresponding one information recording surface, making it possible to shorten time for resetting the adjustment value and to promptly complete the resetting processing.

Further, since the adjustment value is a gain value for servo control, it is possible to shorten time for resetting the gain value.

Moreover, since the differential data B between the adjustment value set previously and corresponding to the one information recording surface L0 or L1 and the adjustment value corresponding to the other information recording surface L1 or L0 is stored, it is possible to reset the adjustment value in a short time only by a simple processing such as subtraction or addition without the need to repeat the original setting processing.

Furthermore, if adjustment values are reset for the respective information recording surfaces of the two-layer disk, it is possible to shorten time necessary for making the resetting.

Additionally, when information is reproduced again from the information recording surface from which information was previously reproduced, information reproduction can be started in a short time by promptly resetting the adjustment value for servo control.

In the above-described first embodiment, first, it is only determined whether or not the DVD 1 has been replaced by another DVD 1, thereby determining whether a new adjustment value calculation processing or an adjustment value calculation processing using the differential data B is conducted and then a series of information reproduction processings are started. Alternatively, if characteristic identification information is provided for every DVD which is a two-layer disk, the characteristic identification information is stored in the memory 6a in associated with the differential data B. By doing so, even if the DVD is frequently replaced by another DVD, it is possible to reset an adjustment value corresponding to each information recording surface in a short time by calculating the adjustment value corresponding to each information recording surface using the differential data B corresponding to each information recording surface in the installed DVD based on the identification information when the DVD which was previously installed and from which information was previously reproduced is reinstalled.

Also, in this case, since the differential data B and the identification information are stored in associated with each other, it is possible to ensure associating each DVD with the differential data B and to accurately reset each adjustment value.

(II) Second Embodiment

Figure 3:
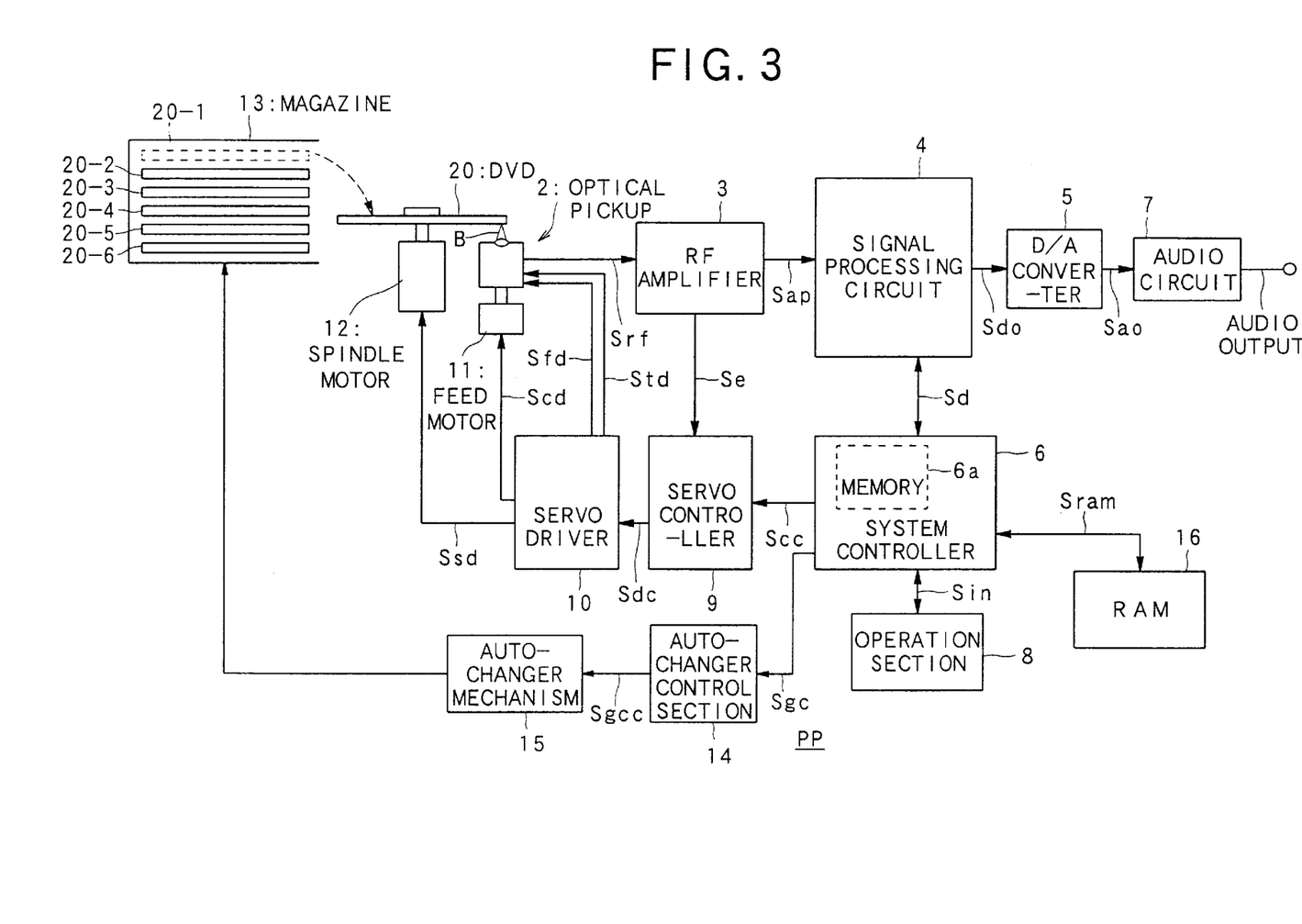
FIG. 3 is a block diagram showing the schematic constitution of an information reproduction apparatus according to a second embodiment of the present invention.
Figure 4:
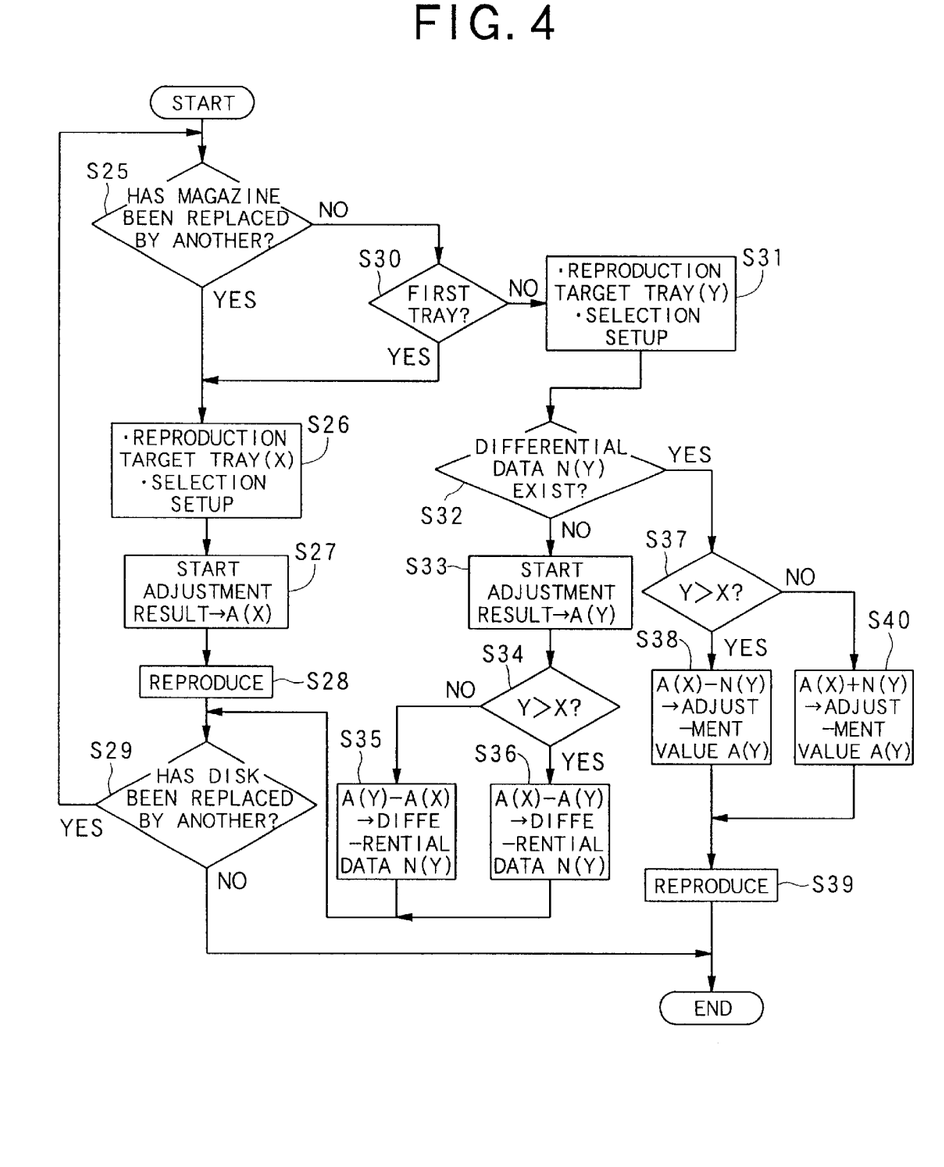
FIG. 4 is a flowchart showing an information reproduction processing according to the second embodiment.

Next, the second embodiment which is another embodiment according to the present invention will be described with reference to FIGS. 3 and 4. FIG. 3 is a block diagram showing the schematic constitution of an information reproduction apparatus according to the second embodiment, and FIG. 4 is a flowchart showing information reproduction processings according to the second embodiment.

In the above-described first embodiment, description has been given to a case where the present invention is applied to the information reproduction apparatus P for reproducing audio information from each of the information recording surfaces L0 and L1 of the DVD 1 which is a two-layer disk. In the second embodiment to be described hereinafter, the present invention is applied to an information reproduction apparatus having a so-called auto-changer function for taking out DVDs one by one from a magazine containing a plurality of DVDs each having only one information recording surface layer on which audio information is recorded, and for optically reproducing audio information recorded on the information recording surface formed in the DVDs thus taken out.

First, the constitution and overall operation of the information recording apparatus according to the second embodiment will be described with reference to FIG. 3.

As shown in FIG. 3, an information recording apparatus PP according to the second embodiment is comprised of an optical pickup 2, an RF amplifier 3, a signal processing circuit 4, a D/A converter 5, a system controller 6, an audio circuit 7, an operation section 8, a servo controller 9, a servo driver 10, a feed motor 11 and a spindle motor 12 and an RAM 16 as in the case of the information recording apparatus P according to the first embodiment, as well as a magazine 13 capable of simultaneously containing six DVDs 20 in a state in which the DVDs are mounted on their individual exclusive trays, an auto-changer control section 14 and an auto-changer mechanism 15.

Next, the overall operations of the respective constituent elements will be described. It is noted that the same members in FIG. 3 as those in FIG. 1 are denoted by the same member numbers and detailed description will not be given thereto.

In the information reproduction apparatus PP in the second embodiment, the optical pickup 2, the RF amplifier 3, the signal processing circuit 4, the D/A converter 5, the system controller 6, the audio circuit 7, the operation section 8, the servo controller 9, the servo driver 10, the feed motor 11, the spindle motor 12 and the RAM 16 emit a light beam B onto an information recording surface in a DVD 20 taken out from the magazine 13 and installed in the spindle motor 12 by the same operation as that of the information reproduction apparatus P in the first embodiment described above, and reproduce audio information recorded on the information recording surface based on the reflection light of the light beam B.

An adjustment value for the above-described focus servo control corresponding to one information recording surface (i.e., one DVD 20) is, unlike the first embodiment, calculated by a series of processings to be described later.

At this moment, the auto-changer control section 14 generates a control signal Sgcc for controlling the auto-changer mechanism 15 so as to select a tray in the magazine 13 containing a DVD 20 which is designated by the operation section 8 and from which information is to be reproduced based on a control signal Sgc from the system controller 6, to take out the DVD 20 and install the DVD 20 in the spindle motor 12, and outputs the signal Sgcc to the auto-changer mechanism 15.

As a result, the auto-changer 15 moves the DVD 20 on which audio information to be reproduced is recorded from the tray in the magazine 13 to the spindle motor 12 based on the control signal Sgcc, and installs DVD 20 to the spindle motor 12.

Next, information reproduction processings according to the second embodiment will be described while using FIG. 4.

It is noted that the information reproduction processings shown in FIG. 4 are executed mainly under the control of the system controller 6, for reproducing audio information recorded on each DVD 20 while setting an adjustment value used for the focus servo control as in the case of the first embodiment.

Further, in the following description, six DVDs 20 contained in the magazine 13 will be identified as and referred to as DVD $20_{-1}$ to DVD $20_{-6}$, respectively.

It is also noted that among the information reproduction processings shown in FIG. 4, a processing for setting the above-described adjustment value is conducted when power is turned on or every time reproduction is resumed after stopping reproduction.

As shown in FIG. 4, in the information reproduction processings in the second embodiment, it is first determined by a detection member (not shown) provided with a member for supporting the magazine whether or not the magazine 13 installed in the information reproduction apparatus PP has been replaced (changed over) per se (step S25).

If the replacement of the magazine 13 is executed (step S25; 'YES') a so-called setup processing including selecting a tray (X) (note that the tray which mounts the X-th DVD $20_{-X}$ will be referred to as tray (X) hereinafter) which mounts the X-th DVD $20^{-X}$ (where X is a natural number not lower than 1 and not higher than 6) on which audio information to be reproduced is recorded from the DVD $20_{-1}$ to DVD $20_{-6}$ using the operation section 8, installing the DVD $20^{-X}$ mounted on the tray (X) to the spindle motor 12 and the like (step S26), is carried out.

Next, the adjustment value corresponding to a (single) information recording surface is obtained by a method of, for example, reciprocating the focal position of the light beam B in a direction perpendicular to the (single) information recording surface of the DVD $20^{-X}$ after replacement, and the obtained adjustment value is stored as an adjustment value A(X) corresponding to the DVD $20_{-X}$ in the memory 6a (step S27).

Audio information recorded on the installed DVD $20^{-X}$ is reproduced while conducting focus servo control using the stored adjustment value A(X) (step S28).

Next, it is determined whether or not an instruction to replace the DVD $20_{-X}$ by another DVD 20 is executed by the operation section 8 (step S29). If the replacement instruction is not executed (step S29; 'NO'), the overall reproduction processings for the DVD 20 are ended. If the replacement instruction is issued (step S29; 'YES'), the procedures return to the step S25 again and a series of processings described above are repeated.

It is noted that the adjustment value A (X) calculated by the processings of the steps S25 to S29 executed when the magazine 13 is replaced is used as a reference adjustment value A(X) for calculating adjustment values corresponding to other DVDs 20 in the same magazine 13 in later processings.

On the other hand, if the determination of the step S25 indicates that the magazine 13 has not been replaced and the calculation of the reference adjustment value A(X) described above has been already completed (step S20; 'NO'), it is then determined whether or not the tray which mounts the DVD 20 from which information is to be reproduced in response to the instruction of the operation section 8 is the tray which mounts a DVD 20 from which information is reproduced first after the power of the information reproduction apparatus PP is turned on (step S30).

If the tray is the tray which mounts a DVD 20 from which information is reproduced first after power is turned on (step S30; 'YES') the procedures are moved to processings of the step S26 and the following so as to newly calculate the reference adjustment value A(X) used for the calculation of adjustment values corresponding to the respective DVDs 20 within a period for which the power is kept to be turned on.

On the other hand, if the determination of the step S30 indicates that the tray which mounts the DVD 20 from which information is to be reproduced is not the tray which mounts the DVD 20 which is reproduced first after power is turned on (step S30; 'NO'), a so-called setup processing including selecting a tray (Y) (note that the tray which mounts the DVD $20_{-Y}$ will be denoted by tray (Y) hereinafter) which mounts a DVD 20, i.e., DVD $20_{-Y}$ (where Y is a natural number not lower than 1 and not higher than 6) other than the DVD $20^{-X}$ from which information is reproduced after calculating the adjustment value A(X) using the operation section 8, installing the DVD$_{-Y}$ mounted on the tray (Y) to the spindle motor 12 and the like, is carried out (step S31).

Next, it is checked whether or not differential data N (Y) to be described later (i.e., differential data N(Y) indicating the difference between the adjustment value A(Y) corresponding to the DVD $20_{-Y}$ contained in the magazine 13 and the above-described reference adjustment value A(X)) already exists in the memory 6a (step S32).

If the differential data N (Y) has not been calculated yet and not stored in the memory 6a (step S32; 'NO'), an adjustment value corresponding to an information recording surface in the DVD $20_{-Y}$ is obtained using the DVD $20_{-Y}$ mounted on the currently selected tray (Y) (see the step S31) as in the case of the step S27 and the obtained adjustment value is stored as an adjustment value A(Y) corresponding to the DVD $20_{-Y}$ in the memory 6a (step S33)

Next, it is determined whether or not the number Y of the currently selected DVD $20_{-Y}$ is higher than the number X of the DVD $20_{-X}$ used for the calculation of the reference adjustment value A(X) (step S34).

If the number Y is not higher than the number X (step S34; 'NO'), then the reference adjustment value A(X) is subtracted from the adjustment value A(Y) calculated at the step S33, the subtraction result is stored as the differential data N(Y) between the adjustment value A(Y) and the reference adjustment value A(X) in the memory 6a (step S35) and the procedures move to the step S29. Thereafter, the processings of the step S29 and the following are executed.

On the other hand, if the determination of the step S34 indicates that the number Y is higher than the number X (step S34; 'YES'), then the adjustment value A(Y) is subtracted from the reference adjustment value A(X), the subtraction result is stored as the differential data N(Y) between the adjustment value A(Y) and the reference adjustment value A(X) in the memory 6a (step S36) and the procedures move to the step S29. Thereafter, the processings of the step S29 and the following are executed.

If the determination of the step S32 indicates that the differential data N(Y) has been already calculated by the processings of the steps S33 to S36 and stored in the memory 6a (step S32; 'YES'), then it is determined whether or not the number Y of the currently selected DVD $20_{-Y}$ is higher than the numberX of the DVD $20_{-X}$ used for the calculation of the reference adjustment value A(X) before calculating a new adjustment value A(Y) using the differential data N(Y) (step S37).

If the number Y is higher than the number X (step S37; 'YES'), then a value obtained by subtracting the differential data N(Y) from the reference adjustment value A(X) is regarded as a new adjustment value A(Y) corresponding to an information recording surface in the $DVD_{-Y}$ on which to-be-reproduced audio information is recorded, and stored in the memory 6a (step S38). At the step S38, the new adjustment value A(Y) is obtained by subtracting the differential data N(Y) from the reference adjustment value A(X) because the differential data N(Y) is calculated at the step S36 by subtracting the adjustment value A(Y) at that time from the reference adjustment value A(X).

Thereafter, audio information is reproduced from the information recording surface in the DVD $20_{-Y}$ while conducting focus servo control using the stored new adjustment value A(Y) (step S39), thus ending a series of processings.

On the other hand, if the determination of the step S37 indicates that the number Y is not higher than the number X (step S37; 'NO'), then a value obtained by adding the differential data N(Y) to the reference adjustment value A(X) is regarded as a new adjustment value A(Y) described above and stored in the memory 6a (step S40). At the step S40, the new adjustment value A(Y) is obtained by adding the differential data N(Y) to the reference adjustment value A(X) because the differential data N(Y) is calculated at the step S35 by subtracting the reference adjustment value A(X) from the adjustment value A(Y) at that time.

Thereafter, audio information is reproduced from the information recording surface in the DVD $20_{-Y}$ while conducting focus servo control using the stored new adjustment value A(Y) (step S391, thus ending a series of processings.

As stated so far, according to the information reproduction processings in the second embodiment, when the adjustment value A(Y) corresponding to the information recording surface of the DVD $20_{-Y}$ is reset, the resetting is made by using the reference adjustment value A(X) previously set and the stored differential data N(Y). Due to this, it is not necessary to repeat the original setting processing for the information recording surface in the corresponding one DVD $20_{-Y}$ if resetting the adjustment value A(Y), thereby making it possible to shorten time for resetting the adjustment value A(Y) and promptly completing the resetting.

Furthermore, since the differential data N(Y) between the previously-set reference adjustment value A(X) and the adjustment value A(Y) is stored, it is possible to reset the adjustment value A(Y) in a short time only by conducting a simple processing such as subtraction or addition without the need to repeat the original setting processing.

Moreover, if the adjustment value A(Y) is reset for each information recording surface formed in each of a plurality of DVDs 20 simultaneously installed in the magazine 13, it is possible to shorten necessary time for the resetting.

Additionally, when information is reproduced again from the DVD $20_{-Y}$ from which information was previously reproduced, information reproduction can be started in a short time by promptly resetting the adjustment value A(Y) for servo control.

(III) Third Embodiment

Next, third embodiment according to the present invention will be described with reference to FIG. 5.

In the above-described first and second embodiments, description has been given to a case where the present invention is applied to the information reproduction apparatus P or PP for reproducing audio information recorded on the DVD 1 which is a two-layer disk or the DVD 20 which is a single-layer disk. As shown FIG. 5, it is also possible to apply the present invention to an information recording and reproduction apparatus PR which can record recording information inputted into a recordable DVD 1' from externally.

Figure 5:
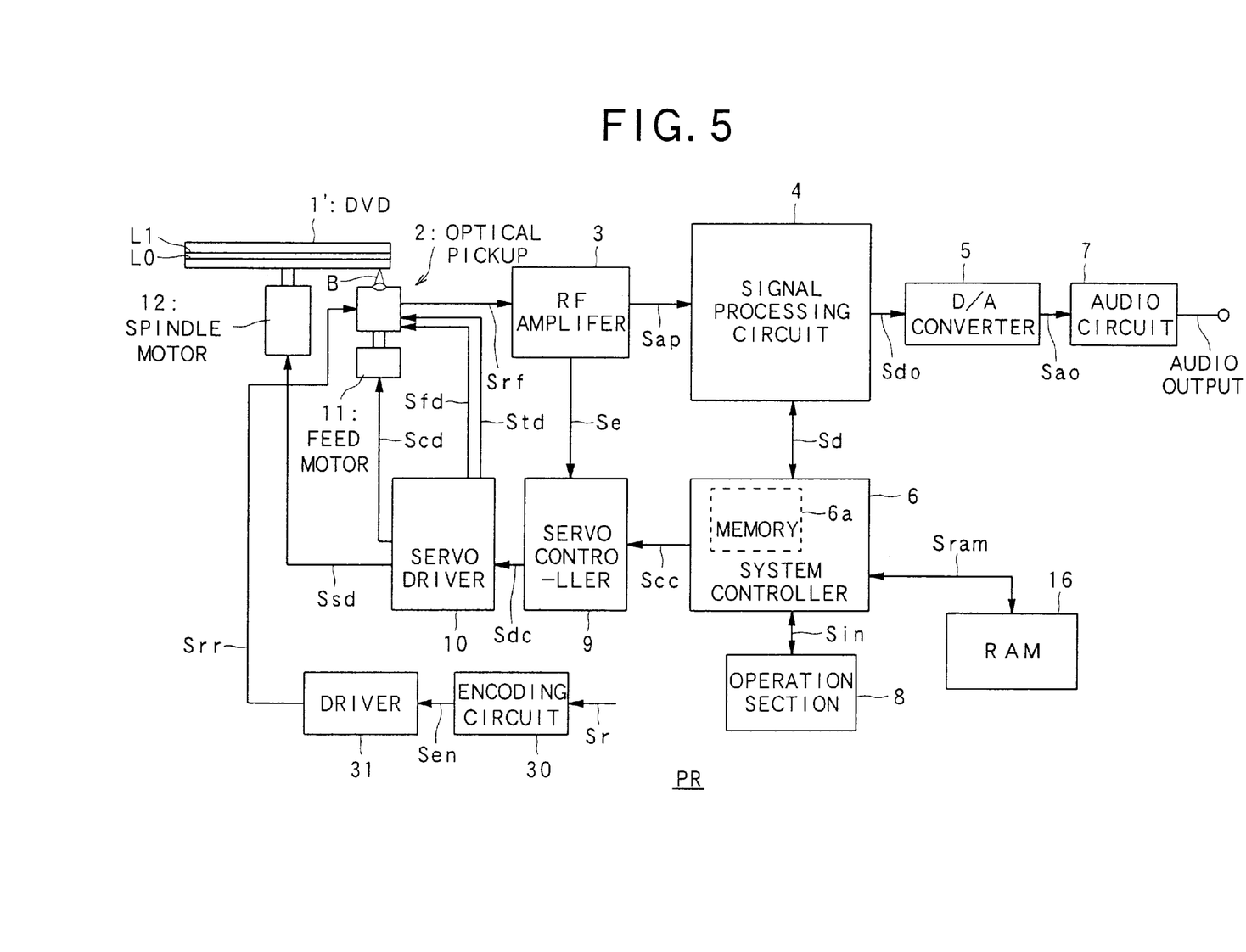
FIG. 5 is a block diagram showing the schematic constitution of an information recording and reproduction apparatus according to the other embodiment.

In this case, the information recording and reproduction apparatus PR is constituted by, for example, comprising not only the constituent elements of the information reproduction apparatus P shown in FIG. 1 but also, as shown in FIG. 5, an encoding circuit 30 for encoding a recording information Sr provided from externally and generating encoding information Sen, and a driver 31 generating a drive signal Srr for emitting a recording light beam corresponding to recording information Sr by driving a semiconductor laser (not shown) provided in the optical pickup 2 based on the encoding information Sen and outputting the generated drive signal Srr to the semiconductor laser.

At this time, the above-described focus servo control or tracking servo control is executed in the same manner as that in the first embodiment and further a processing for setting the above-described adjustment value is executed according to procedures show in FIG. 2.

By adding the encoding circuit 30 and the driver 31 as described above to the information reproduction apparatus PP shown in FIG. 3, the apparatus PP can be constituted as an information recording and reproduction apparatus having an auto-changer function and including a plurality of recordable DVDs.

Furthermore, the present invention can be applied to an information reproduction apparatus having a magazine containing a plurality of DVDs 1 which are two-layer disks by combining the first embodiment and the second embodiment described above.

In this case, a reference adjustment value is calculated with reference to any one of information recording surfaces in one DVD 1 set in advance in the same manner as that in the second embodiment, and differential data between the reference adjustment value and an adjustment value corresponding to an information recording surface in another DVD 1. By doing so, if an adjustment value corresponding to the information recording surface in another DVD 1 is reset, the resetting can be completed in a short time using the reference adjustment value and the stored differential data.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H(Heisei)11–363,240 filed on Dec. 21, 1999 including the specification, claims, drawings and summary is incorporated herein by reference in its entirety.

What is claimed is:

1. A servo adjustment apparatus for setting an adjustment value for servo control of at least one of optical recording of information on information recording surfaces and optical reproduction of information recorded on the information recording surfaces, comprising:
   a specific setting device for setting a specific adjustment value corresponding to one of said information recording surfaces;
   an other setting device for setting another adjustment value corresponding to another one of said information recording surfaces other than said one of said information recording surfaces;
   a calculation device for calculating a relational value indicating a relationship between said specific adjustment value and said another adjustment value;
   a storage device for storing said calculated relational value; and
   a resetting device for resetting the specific adjustment value using said another adjustment value set previously and said relational value when said specific adjustment value is reset, and for resetting said another adjustment value using said specific adjustment value set previously and said relational value when said another adjustment value is reset.

2. The servo adjustment apparatus according to claim 1, wherein each of said adjustment values is a gain value in said servo control.

3. The servo adjustment apparatus according to claim 1, wherein said storage device stores said relational value and identification information for identifying said information recording surface corresponding to the relational value, while associating said relational value with said identification information.

4. The servo adjustment apparatus according to claim 1, wherein:
   said relational value is a difference between said specific adjustment value set previously and said another adjustment value set previously; and
   said resetting device resets the specific adjustment value by subtracting said relational value from said another adjustment value set previously when said specific adjustment value is reset, and resets said another adjustment value by subtracting said relational value from said specific adjustment value set previously when said another adjustment value is reset.

5. The servo adjustment apparatus according to claim 1, wherein one of said information recording surfaces and another one of said information recording surfaces are formed in one optical disk while being layered and away from each other.

6. The servo adjustment apparatus according to claim 1, wherein one of said information recording surfaces is formed in one optical disk, and another one of said information recording surfaces is formed in an optical disk, other than said one optical disk, installed simultaneously with said one optical disk.

7. An information recording apparatus comprising
   (a) a servo adjustment apparatus for setting an adjustment value for servo control of at least one of optical recording of information on information recording surfaces and optical reproduction of information recorded on the information recording surfaces, comprising:
      a specific setting device for setting a specific adjustment value corresponding to one of said information recording surfaces;
      an other setting device for setting another adjustment value corresponding to another one of said information recording surfaces other than said one of said information recording surfaces;
      a calculation device for calculating a relational value indicating a relationship between said specific adjustment value and said another adjustment value;
      a storage device for storing said calculated relational value; and
      a resetting device for resetting the specific adjustment value using said another adjustment value set previously and said relational value when said specific adjustment value is reset, and for resetting said another adjustment value using said specific adjustment value set previously and said relational value when said another adjustment value is reset, and
   (b) recording device for recording said information on one of said information recording surfaces or another one of said information recording surfaces while conducting said servo control using said reset adjustment value.

8. An information reproduction apparatus comprising
   (a) a servo adjustment apparatus for setting an adjustment value for servo control of at least one of optical recording of information on information recording surfaces and optical reproduction of information recorded on the information recording surfaces, comprising:
      a specific setting device for setting a specific adjustment value corresponding to one of said information recording surfaces;
      an other setting device for setting another adjustment value corresponding to another one of said information recording surfaces other than said one of said information recording surfaces;
      a calculation device for calculating a relational value indicating a relationship between said specific adjustment value and said another adjustment value;
      a storage device for storing said calculated relational value; and
      a resetting device for resetting the specific adjustment value using said another adjustment value set previously and said relational value when said specific adjustment value is reset, and for resetting said another adjustment value using said specific adjustment value set previously and said relational value when said another adjustment value is reset, and
   (b) a reproduction device for reproducing said information recorded on one of said information recording surfaces and another one of said information recording surfaces while conducting said servo control using said reset adjustment value.

9. A servo adjustment method of setting an adjustment value for servo control of at least one of optical recording of information on information recording surfaces and optical reproduction of information recorded on the information recording surfaces, comprising the processes of:
   setting a specific adjustment value corresponding to one of said information recording surfaces;

setting another adjustment value corresponding to another one of said information recording surfaces other than said one of said information recording surfaces;

calculating a relational value indicating a relationship between said specific adjustment value and said another adjustment value;

storing said calculated relational value;

resetting the specific adjustment value using said another adjustment value set previously and said relational value when said specific adjustment value is reset; and resetting said another adjustment value using said specific adjustment value set previously and said relational value when said another adjustment value is reset.

10. The servo adjustment method according to claim 9, wherein each of said adjustment values is a gain value in said servo control.

11. The servo adjustment method according to claim 9, wherein the process of storing said calculated relational value stores said relational value and identification information for identifying said information recording surface corresponding to the relational value, while associating said relational value with said identification information.

12. The servo adjustment method according to claim 9, wherein:

said relational value is a difference between said specific adjustment value set previously and said another adjustment value set previously;

the process of resetting the specific adjustment value resets said specific adjustment value by subtracting said relational value from said another adjustment value set previously when said specific adjustment value is reset; and the process of resetting said another adjustment value resets said another value by subtracting said relational value from said specific adjustment value set previously when said another adjustment value is reset.

13. The servo adjustment method according to claim 9, wherein one of said information recording surfaces and another one of said information recording surfaces are formed in one optical disk while being layered and away from each other.

14. The servo adjustment method according to claim 9, wherein one of said information recording surfaces is formed in one optical disk, and another one of said information recording surfaces is formed in an optical disk, other than said one optical disk, installed simultaneously with said one optical disk.

15. An information recording method comprising the process of (a) setting an adjustment value for servo control of at least one of optical recording of information on information recording surfaces and optical reproduction of information recorded on the information recording surfaces, comprising the processes of:

setting a specific adjustment value corresponding to one of said information recording surfaces;

setting another adjustment value corresponding to another one of said information recording surfaces other than said one of said information recording surfaces;

calculating a relational value indicating a relationship between said specific adjustment value and said another adjustment value;

storing said calculated relational value;

resetting the specific adjustment value using said another adjustment value set previously and said relational value when said specific adjustment value is reset; and resetting said another adjustment value using said specific adjustment value set previously and said relational value when said another adjustment value is reset, and (b) recording said information on one of said information recording surfaces or another one of said information recording surfaces while conducting said servo control using said reset adjustment value.

16. An information reproduction method comprising the processes of (a) setting an adjustment value for servo control of at least one of optical recording of information on information recording surfaces and optical reproduction of information recorded on the information recording surfaces, comprising the processes of:

setting a specific adjustment value corresponding to one of said information recording surfaces;

setting another adjustment value corresponding to another one of said information recording surfaces other than said one of said information recording surfaces;

calculating a relational value indicating a relationship between said specific adjustment value and said another adjustment value;

storing said calculated relational value;

resetting the specific adjustment value using said another adjustment value set previously and said relational value when said specific adjustment value is reset; and resetting said another adjustment value using said specific adjustment value set previously and said relational value when said another adjustment value is reset, and (b) reproducing said information recorded on one of said information recording surfaces and another one of said information recording surfaces while conducting said servo control using said reset adjustment value.

* * * * *